Dec. 30, 1941. J. J. OLEKSIW 2,268,164
BATTERY BOX OR SIMILAR COMPARTMENT CLOSURE
Filed July 3, 1940 3 Sheets-Sheet 1
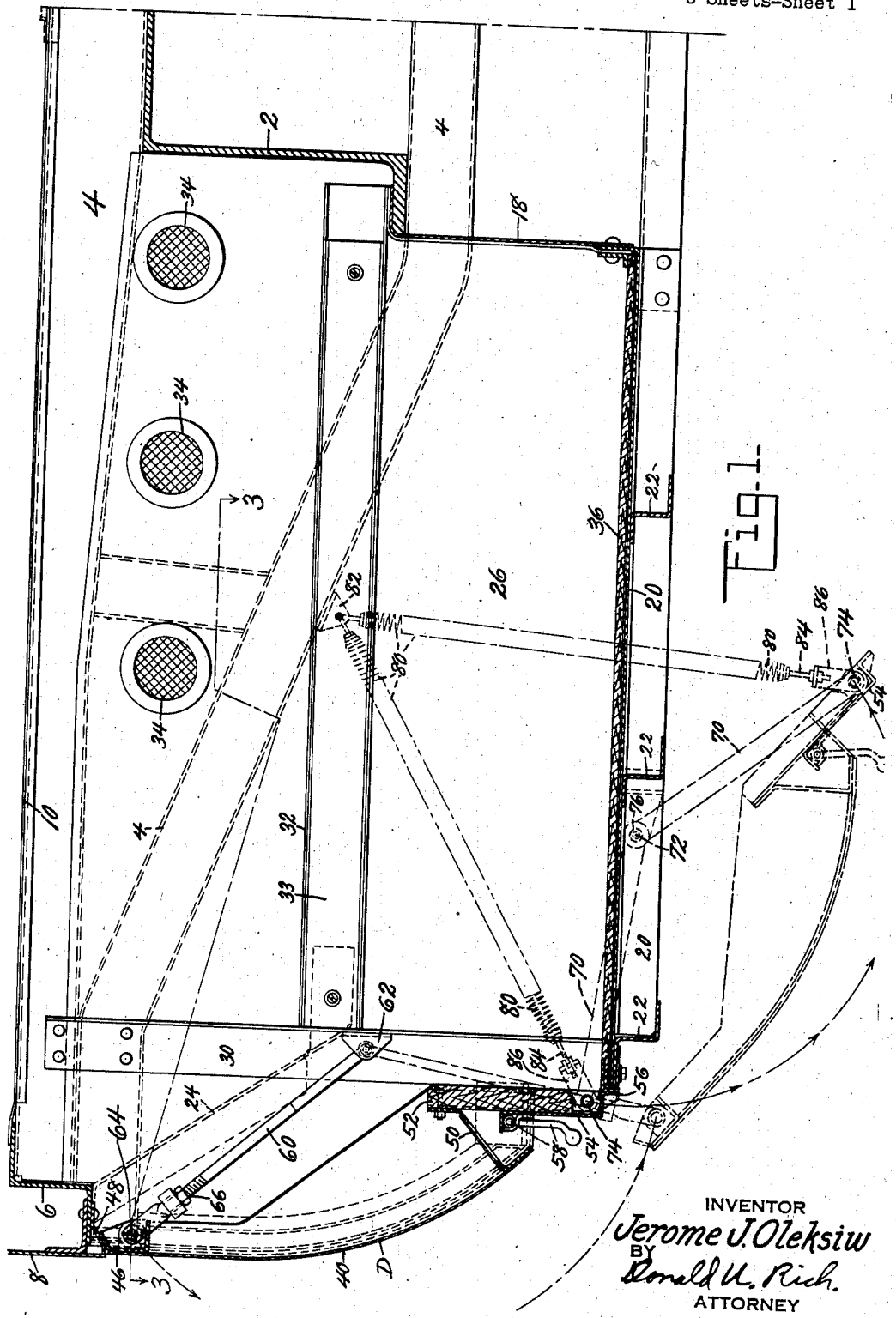
INVENTOR
Jerome J. Oleksiw
BY
Donald U. Rich.
ATTORNEY Dec. 30, 1941.  J. J. OLEKSIW  2,268,164
BATTERY BOX OR SIMILAR COMPARTMENT CLOSURE
Filed July 3, 1940   3 Sheets-Sheet 2
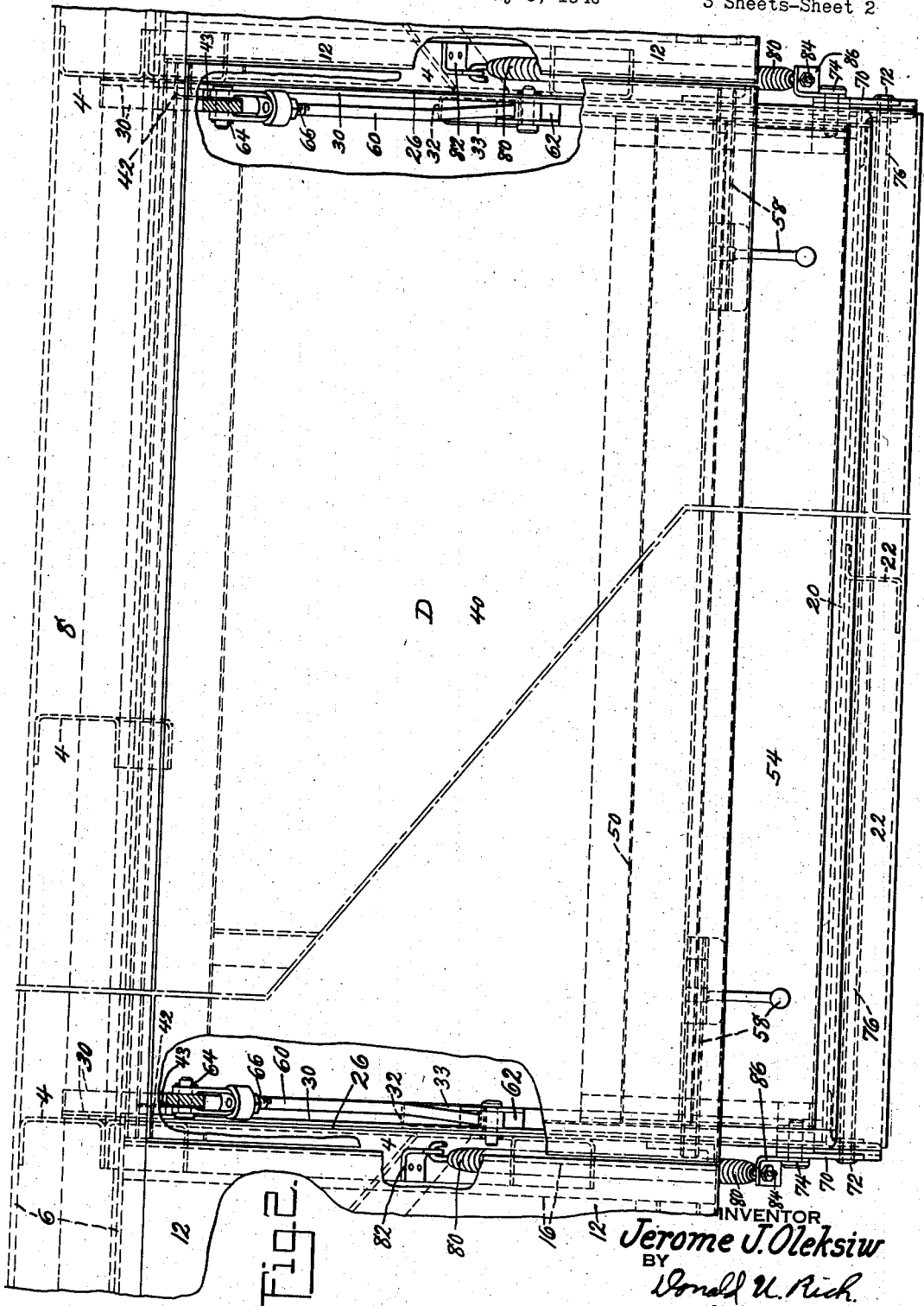
INVENTOR
Jerome J. Oleksiw
BY
Donald U. Rich
ATTORNEY

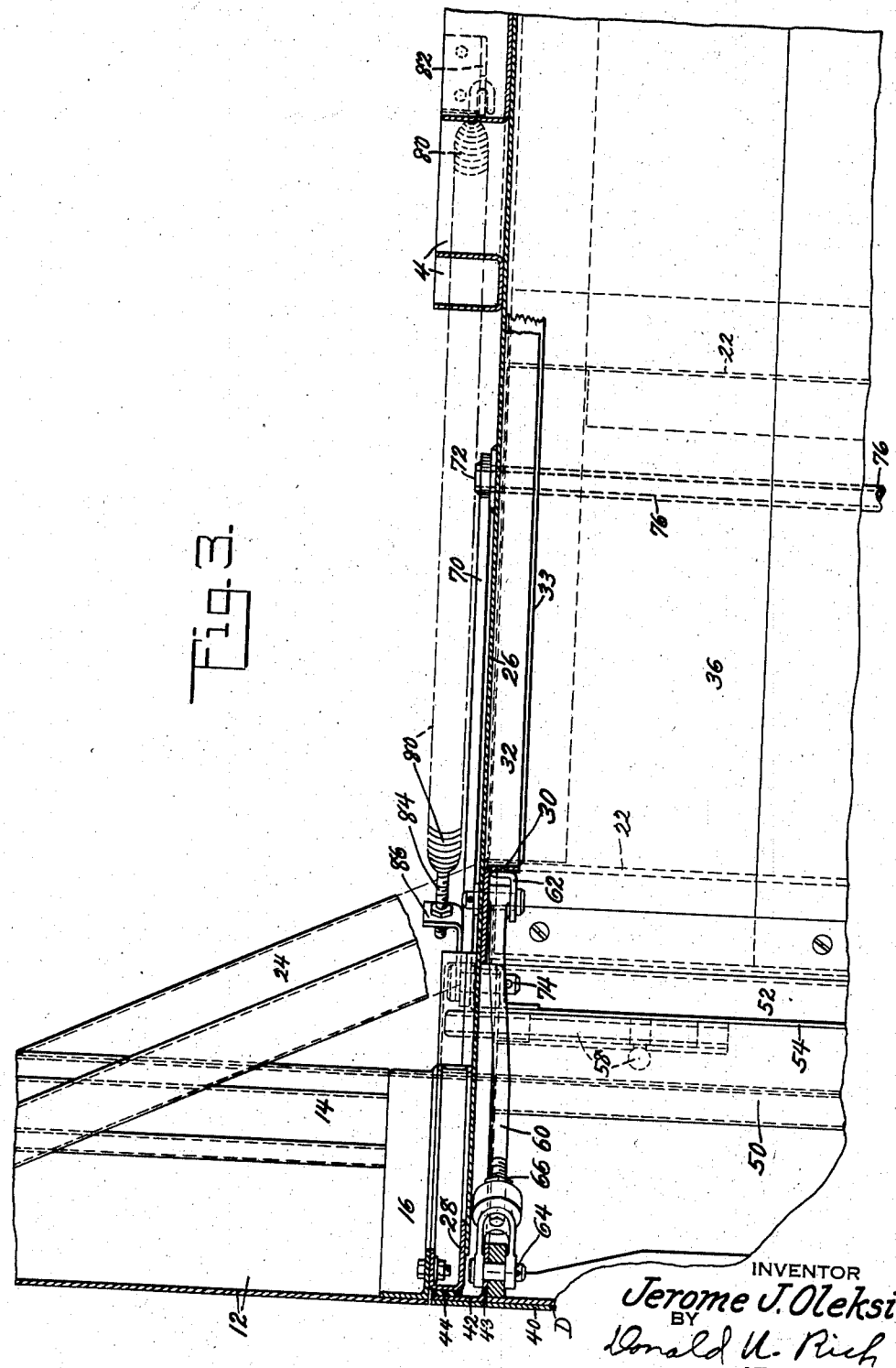

Patented Dec. 30, 1941

2,268,164

UNITED STATES PATENT OFFICE 2,268,164

BATTERY BOX OR SIMILAR COMPARTMENT CLOSURE

Jerome J. Oleksiw, Shamokin, Pa., assignor to American Car and Foundry Company, New York, N. Y., a corporation of New Jersey Application July 3, 1940, Serial No. 343,822

10 Claims. (Cl. 105—51)

This invention relates to compartments carried under rail cars and in particular to such compartments when intended for use as battery boxes.

In old rail car construction the battery box and other compartments were carried below the car floor and fully exposed to view, thus producing a car which was very unattractive. The present trend in rail car construction is to extend the side walls to form a skirting of sufficient length to hide all the auxiliary equipment, boxes and compartments carried under the floor. With these extended sides or skirting doors giving access to the battery box and other compartments have been hinged to swing upwardly, but such a mounting necessitates provision of holding means for the doors which mar the exterior of the car and prevents the production of a smooth walled attractive vehicle. In certain cases it has been proposed to hinge the doors giving access to the battery box and other compartments to swing downwardly but with such a door the projection out from the wall of the car is excessive making it almost impossible for the battery or other equipment to be serviced. Rail cars have the floor located at a height of approximately four feet three inches from the rail and the skirting or side wall extensions in order to fully hide the auxiliary equipment carried beneath the floor must be two feet or more in width. Since the top of the skirting does not start from the top of the floor but from the bottom of the sills, it is apparent that the lower edge of the skirting will be at a height of approximately sixteen inches from the rail, thus it will be seen that it is impossible to merely fold the door down to obtain full access to the battery box or other compartment. It is an object, therefore, of the present invention to provide a link hung door for rail cars conforming to the skirting of the car and moving down and under the floor of the battery box or other compartment and into such a position as to clear the rail and permit movement of the car if necessary while the door is open.

A further object of the invention is the provision of a link hung door for rail cars, which door conforms to the skirting and swings downwardly and inwardly beneath the box or compartment which it closes and is counterbalanced by springs or other resilient means so arranged as to tend to hold the door in either open or closed position.

A still further object of the invention is the provision of a compartment door for rail cars, which door conforms to the skirting outline, thus continuing the smooth streamline exterior of the car.

A yet further object of the invention is the provision of a door in the skirting of a rail car, which door moves to give full and unimpeded access to a battery box or other compartment carried beneath the floor of the car and which door will not project into clearance limits when open.

These and other objects of the invention will be apparent to persons skilled in the art from a study of the following description and accompanying drawings, in which:

Figure 1 is a sectional view taken through the lower portion of the car at the battery box or similar compartment;

Fig. 2 is an elevational view of the battery box or other compartment with parts broken away in order to more fully disclose the mounting and counterbalancing control for the door, and Fig. 3 is a sectional view taken substantially on line 3—3 of Figure 1 and disclosing more in detail the door mounting and control.

Referring now to the drawings in detail, it will be seen that the invention has been shown as applied to a battery box carried beneath the floor of the car, but it is to be understood that it is equally applicable to other compartments carried beneath the floor of the car. The car as shown is formed with customary center sills 2, cross bearers 4 and side sills 6. Side walls 8 are attached to the side sills as is also the sub-flooring or sealing sheet 10. The side sills have attached thereto rigid skirting or side wall extensions 12 (Figs. 2 and 3) which skirting is stiffened at its lower edge by an angle structure 14 and along its side edges by angles 16.

The battery box or other compartment is constructed with the back wall 18 connected to a flange of the center sill at its lower edge to an upwardly directed flange formed on the metal floor sheet 20. This metal floor sheet is stiffened by and supported by a plurality of Z or other form members 22 extending both longitudinally and transversely of the floor. The outermost of these floor stiffeners and supports is bent upwardly and outwardly as at 24 (Fig. 3) for attachment to the side sills, thereby supporting the free edge of the box or compartment directly by the side sills. The end walls of the battery box or other compartment are formed by sheets 26 fastened to the cross bearers and extending downwardly therebeneath for direct connection to the floor structure of the battery box or compartment. These end sheets are also attached at their inner edges to the center sill and back wall structure of the box, while their outer edge is attached to a channel form stiffener 28 bolted or otherwise secured to the skirt stiffener 16 (Fig. 3). The end walls are stiffened by vertically extending angles 30, as well as by horizontally extending channels 32, the latter of which is adapted to receive wood fillers 33 acting as a spacer or guide for the batteries which will be slid into the box or compartment. Ventilation for the battery box is accomplished by means of screened openings 34 formed in the end walls, while the floor of the box is protected against corrosion and wear by means of a wood or other protective flooring 36, thus it will be seen that an open sided box or compartment has been provided rigidly tied into the framing of the car and properly braced and supported thereby.

In order to close the outer side of the battery box or other compartment a door D is provided. This door, as clearly shown in Figs. 1 and 3 is formed with a curved sheet 40 conforming to the skirt contour and stiffened along its side edges by angles 42, having one leg 43 thereof directed inwardly in spaced relation to the edge of the door sheet and with the out-turned leg adapted to rest upon a rubber or other sealing strip 44 interposed between the leg and the channel member 28 previously referred to. The top edge of the door sheet is stiffened by a distorted channel form member 46 which has one flange inclined at an angle to the web and adapted to cooperate with a similar angled distorted Z form member 48 secured to the side sill of the car. The lower edge of the door sheet is stiffened by means of a Z form member 50 having the web located substantially at right angles to the adjacent portion of the door sheet, while the inner flange is deformed and secured to a vertically extending buffer wall or stop 52 preferably made of wood or some other acid resisting material and which is adapted to prevent outward shifting of the batteries. The buffer wall or stop is formed not only by the members 52 but by a metallic member 54 suitably connected to the various stiffeners for the door sheet and, therefore, forming the true lower edge of the door. This metallic member has a vertically directed lower flange 56 adapted to cooperate with and abut the outer edge of the compartment floor to close the compartment. The space between the lower edge of the curved door sheet and the metallic member 54 forming the lower edge of the door permits the mounting of latch bolts 58 adapted to be slid along the door plate into or out of engagement with the end walls of the compartment, thus either locking or releasing the door.

Swinging of the door is permitted by means of a plurality of links, the upper links 60 being pivoted at their inner ends to bracket 62 fastened on vertical stiffener 30, while the outer ends are pivoted as at 64 to the inturned leg of door stiffeners 42. These links, in order to provide for proper adjustment, are formed in two parts threaded together as at 66, thereby permitting changing of the length of the links to insure proper sealing of the upper edge of the door with the strip carried by the car sills. The lower edge of the door is controlled by links 70 pivoted at their inner ends as at 72 to the compartment supporting floor structure and at their outer ends as at 74 to the metallic member 54 forming the lower edge of the complete door.

To prevent any binding of the door and make the door edges move in unison, the links 70 are welded or otherwise secured to a tube 76 extending across the compartment beneath the floor thereof and constituting the pivot 72 previously referred to. It will be obvious that the door structure will have considerable weight and in order to counterbalance a portion of this weight springs 80 are provided attached at their inner ends by a clip 82 fastened to the cross bearer lower member and at their outer ends by an adjusting bolt 84 joining the spring to a clip 86 pivotally connected to the door preferably on the same axis as is the link 70. It will be seen that these springs urge the lower edge of the door toward the edge of the compartment, thus effectively holding it closed at all times and when the door movement is started these springs will sustain a certain portion of the weight and assist the operator in controlling the downward movement of the car structure. As soon as the springs in the downward movement of the door pass the pivot axis 72, they assist in the movement of the door and pull the same in under the floor and in their final position, as shown in line and dash of Figure 1, will retain the lowered door in its position beneath the battery box floor; thus it will be seen that the springs tend to hold the door against the compartment and to counterbalance a portion of the door weight, while also holding the door in open position. It will also be seen that by positioning the links 60 and 70, as shown and described, the door structure has an outward and downward bodily rotating movement roughly corresponding to that obtainable by the use of a long pivot rod carried by the car structure somewhere adjacent the roof. In other words, the movement is that roughly corresponding to that obtainable by rotation about an apparent center either located near the roof or exterior of the car. It will also be seen that the position of links 70 when the door is closed will form an effective tie preventing any undue stress being placed on the door structure while resisting side thrusts incidental to possible shifting of the batteries in the compartment.

While the invention has been described more or less in detail, it will be obvious to persons skilled in the art that various modifications and rearrangements of parts may be made and all such modifications and rearrangements of parts are contemplated as will fall within the scope of the appended claims defining my invention.

What is claimed is:

1. In a railway car having a floor and side skirting extending downwardly below the floor the combination of a floored compartment carried by the car beneath the car floor and behind the skirting line, and a door for closing said compartment, said door being pivotally connected to the car and conforming to the skirting contour to form a smooth substantially continuous surface therewith when closed and adapted to swing in its entirety downwardly and inwardly beneath the compartment floor to open position.

2. In a railway car having a floor and side skirting extending downwardly below the floor the combination of a floored compartment carried by the car beneath the car floor and behind the skirting line, a door for closing said compartment and conforming to the side skirting contour to form a smooth substantially continuous surface therewith when the door is closed, and a plurality of links connected to said door and car at spaced points to support the door and to control the swinging of the door and cause all parts thereof to move downwardly and inwardly to a position beneath the compartment floor when open.

3. In a railway car having a floor and side skirting extending downwardly below the floor the combination of a compartment carried by the car beneath the car floor and behind the skirting line, a door for closing said compartment and conforming to the side skirting contour to form a smooth substantially continuous surface therewith when the door is closed, a pair of upper links connected to the door adjacent the upper edge thereof and inclining downwardly and inwardly for connection to the car, and a pair of lower links connected to the door adjacent the lower edge thereof and extending inwardly for connection to the car, said links causing the door to move bodily downward and inward to a final open position beneath the compartment.

4. In a railway car having a floor and side skirting extending downwardly below the floor the combination of a compartment carried by the car beneath the car floor and behind the skirting line, a door for closing said compartment and conforming to the side skirting contour to form a smooth substantially continuous surface therewith when the door is closed, a pair of upper links connected to the door adjacent the upper edge thereof and inclining downwardly and inwardly for connection to the car, a pair of lower links connected to the door adjacent the lower edge thereof and extending inwardly for connection to the car, said links causing the door to move bodily downward and inward to a final open position beneath the compartment, and resilient means connected to the car and door for controlling the door movements and to aid in holding the door in both open and closed positions.

5. In a railway car having a floor and side skirting extending downwardly below the floor the combination of a compartment carried by the car beneath the car floor and behind the skirting line, a door for closing said compartment and conforming to the side skirting contour to form a smooth substantially continuous surface therewith when the door is closed, a pair of upper links connected to the door adjacent the upper edge thereof and inclining downwardly and inwardly for connection to the car, and a pair of lower links connected to the door adjacent the lower edge thereof and extending inwardly for connection to the car, said links causing the door to move bodily downward and inward to a final open position beneath the compartment, said lower links being rigidly connected together and swinging in unison to prevent distortion of said door.

6. In a railway car having a floor and side skirting extending downwardly below the floor the combination of a battery box carried by the car beneath the car floor and behind the skirting surface, and a door structure for closing said compartment and including a battery stop secured to said door adjacent the lower edge thereof, said door being hinged by a plurality of links to the car and forming a smooth substantially continuous surface with the skirting when closed and swinging downwardly and inwardly on said links to an open position beneath the compartment.

7. In a railway car having a floor and side skirting extending downwardly below the floor the combination of a battery box carried by the car beneath the car floor and behind the skirting surface, a door structure for closing said compartment and including a battery stop secured to said door adjacent the lower edge thereof, said door being hinged by a plurality of links to the car and forming a smooth substantially continuous surface with the skirting when closed and swinging downwardly and inwardly on said links to an open position beneath the compartment, and resilient means connected to said door and car to control movements of the door and aid in holding the same in open and closed positions.

8. In a railway car having a floor and side skirting extending downwardly below the floor the combination of a battery box carried by the car beneath the car floor and behind the skirting surface, and a door structure for closing said compartment and including a battery stop secured to said door adjacent the lower edge thereof, said door being hinged by a plurality of links to the car and forming a smooth substantially continuous surface with the skirting when closed and swinging downwardly and inwardly on said links to an open position beneath the compartment, and means connecting certain of said links together to force the same to swing in unison.

9. In a railway car having a floor and side skirting extending downwardly below the floor the combination of a battery box carried by the car beneath the car floor and behind the skirting surface, a door structure for closing said compartment and including a battery stop secured to said door adjacent the lower edge thereof, said door being hinged by a plurality of links to the car and forming a smooth substantially continuous surface with the skirting when closed and swinging downwardly and inwardly on said links to an open position beneath the compartment, and resilient means connected to said door and car to control movements of the door and aid in holding the same in open and closed positions, said resilient means being connected to the car and door in such a position relative to the links that it exerts its maximum holding effort when the door is in the open and closed positions.

10. In a railway car having a floor and side skirting extending downwardly below the floor, the combination of a floored compartment carried by the car beneath the car floor and behind the skirting line, a door for closing said compartment and conforming to the skirting contour to form a smooth substantially continuous surface therewith when the door is closed, and means connecting said door to said car so formed and arranged as to permit all parts of the door to swing downward and inward beneath the compartment floor to an open position.

JEROME J. OLEKSIW.